(12) United States Patent
Tanaka et al.

(10) Patent No.: US 6,550,951 B2
(45) Date of Patent: Apr. 22, 2003

(54) VEHICLE HEADLAMP

(75) Inventors: Hitoshi Tanaka, Shizuoka (JP); Takafumi Iwama, Shizuoka (JP); Toru Takahashi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/083,318

(22) Filed: Feb. 26, 2002

(65) Prior Publication Data

US 2002/0126494 A1 Sep. 12, 2002

(30) Foreign Application Priority Data

Mar. 2, 2001 (JP) .......................................... 2001-057581

(51) Int. Cl.$^7$ ........................................... F21W 101/02
(52) U.S. Cl. ........................ 362/546; 362/544; 362/538; 362/543
(58) Field of Search ................................. 362/538, 539, 362/546, 544, 543, 516, 263, 297, 346, 362

(56) References Cited

U.S. PATENT DOCUMENTS

| 5,678,916 | A | | 10/1997 | Watanabe et al. ............. 362/61 |
| 5,722,768 | A | | 3/1998 | Suzuki et al. ................ 362/265 |
| 5,879,073 | A | * | 3/1999 | Hori et al. ................... 362/344 |
| 6,161,951 | A | | 12/2000 | Yoneyama et al. .......... 362/516 |
| 6,257,748 | B1 | * | 7/2001 | Hashigaya ................... 362/539 |
| 6,309,089 | B1 | * | 10/2001 | Yoneyama et al. ......... 362/263 |
| 6,382,823 | B1 | * | 5/2002 | Kibayashi .................... 362/548 |
| 6,394,636 | B1 | * | 5/2002 | Ashizawa et al. ........... 362/517 |
| 6,428,186 | B1 | * | 8/2002 | Yoneyama ................... 362/265 |

* cited by examiner

*Primary Examiner*—Laura K. Tso
(74) *Attorney, Agent, or Firm*—Koda & Androlia

(57) ABSTRACT

A vehicle headlamp including a lighting circuit unit for lighting a discharge bulb, the lighting circuit unit being provided on an exterior surface of the side wall of the lamb body that is located on the inner side of the lamp body with respect to the width direction of a vehicle. An electric supply cord extending from the lighting circuit unit is disposed along the reflecting surface backside portion of a reflector that is installed in the lamp body.

8 Claims, 4 Drawing Sheets

VEHICLE HEADLAMP

BACKGROUND OF THE INVENTION

1. Field of the Invention

The present invention relates to a vehicle headlamp that has a discharge bulb and more particularly to an attachment structure of a lighting circuit unit to a lamp body of a vehicle headlamp.

2. Related Art

Discharge bulbs are capable of high luminosity irradiation, and such bulbs have been recently adopted as a light source for a vehicle headlamp. In such a vehicle headlamp, a lighting circuit unit for applying high voltage to the discharge bulb for lighting it is needed.

For a vehicle headlamp that was known when discharge bulbs began to be adopted, the lighting circuit unit was attached to a rear wall of the lamp body. However, as seen from FIG. 4, in the structure generally taken, a lighting circuit unit 130 is attached to the bottom wall 112c of a lamp body 112 where it is easy to secure an attachment space for the lighting circuit unit 130.

However, this conventional vehicle headlamp has problems. When the lighting circuit unit 130 is attached to the bottom wall 112c, most of the heat generated in the lighting circuit unit 130 following the lighting of the discharge bulb 118 is diffused upward. This promotes a temperature rise in a lamp chamber 140 heated by the lighted discharge bulb 118.

Moreover, a typical reflector 116 as shown in FIG. 4 has a lower end thereof formed with a bottom wall 116c. When the lighting circuit unit 130 is attached to the bottom wall 112c of the lamp body 112, it is necessary to secure a clearance between the bottom wall 112c and the bottom wall 116c of the reflector 116 for installing wires for a bulb socket 124 and an electric supply cord 126 that connects the lighting circuit unit 130 to the discharge bulb 118. As a result, a size reduction in the reflector 116 is inevitable to some extent, resulting in the sacrifice of corresponding light distribution performance of the lamp.

SUMMARY OF THE INVENTION

Accordingly, it is an object of the present invention to provide a vehicle headlamp in which a lighting circuit unit for the discharge bulb is attached to the lamp body so as not to cause a temperature rise in the lamp chamber and not to sacrifice light distribution performance of the lamp.

In other words, the present invention accomplishes the above objects by way applying an innovation in an attachment position of the lighting circuit unit on a lamp body.

More specifically, the above object is accomplished by a unique structure of the present invention for a vehicle headlamp that comprises a discharge bulb, a reflector for supporting the discharge bulb, a lamp body that houses the reflector therein, a transparent cover attached to a front end open portion of the lamp body, and a lighting circuit unit for lighting the discharge bulb, and in the present invention the lighting circuit unit is attached to an exterior surface of a side wall of the lamp body that is located on an inner side in the vehicle width direction.

The specific shape and attachment posture of the "lighting circuit unit" with respect to the lamp body is not limited as long as such unit is attached to the exterior surface of the lamp body's side wall that is located on the inner side in the vehicle width direction.

As seen from the above, the vehicle headlamp according to the present invention includes a discharge bulb, and the lighting circuit unit for lighting this discharge bulb is attached to the exterior surface of the lamp body's side wall that is located on the inner side of the lamp body in the vehicle width direction. Accordingly, the following operational advantages are obtained.

By way of attaching the lighting circuit unit to the side wall of the lamp body, heat generated in the lighting circuit unit after the lighting of the discharge bulb is diffused upward or sideward with respect to the lighting circuit unit. Accordingly, a temperature rise in the lamp chamber can be effectively restrained.

Further, the side wall extending from the side edge of the reflector is generally not formed so that its reflecting surface is cut large from the position relatively close to the rear apex portion of the reflector as in the bottom wall. Rather, the side wall of a reflector is formed so that its reflecting surface is cut small from a position at a considerable distance in front of the rear apex portion of the reflector. Therefore, by way of attaching the lighting circuit unit to the lamp body inner side wall (and not to the outer side wall) as in the present invention, it is possible td install the electric supply cord, that extends from the lighting circuit unit, so as to be disposed along the reflecting surface back side portion of the reflector. The aiming mechanism for tilting the reflector is generally provided between the reflecting surface back portion and the side and rear walls of the lamp body; accordingly, a relatively large clearance is secured from the beginning. Therefore, contrary to the conventional structure in which the lighting circuit unit is attached to the bottom wall of the lamp body, it is not necessary in the present invention to secure a large clearance for the electric supply between the lamp body and the reflector. Thus, the size of the reflector does not need to be reduced for installing the electric supply cord.

Meanwhile, a transparent cover of a vehicle headlamp is generally inclined toward outside in the vehicle width direction and backward with respect to the vehicle headlamp. As a result, the front-end open portion of the lamp body is also inclined toward outside in the vehicle width direction and backward with respect to the lamp body. Therefore, as to the side walls of the lamp body, the side wall that is located on the inner side in the vehicle width direction has a larger area compared to the side wall that is located on the outer side in the vehicle width direction. In this regard, since the lighting circuit unit is attached to the exterior surface of the side wall on the inner side in the vehicle width direction in the present invention, a relatively large attachment space is secured.

As seen from the above, in the vehicle headlamp equipped with a discharge bulb according to the present invention, the lighting circuit unit is attached to the lamp body without causing a temperature rise in the lamp chamber or without sacrificing light distribution performance of the lamp.

In the above described structure of the vehicle headlamp of the present invention, the reflector can be designed so that a first reflector portion thereof for supporting the discharge bulb and a second reflector portion thereof for supporting a light source bulb other than the discharge bulb are disposed vertically on two levels. Accordingly, a large height dimension can be secured for the side wall of the lamp body, and therefore, the attachment space for the lighting circuit unit is further enlarged. Furthermore, in this two level design of the reflector, it is possible to dispose the electric supply cord, that extends from the light circuit unit, along the recessed area that is between the reflecting surface back side portion of the first reflector portion and the reflecting surface back side portion of the second reflector portion. Thus the space in the lamp chamber can be effectively used, thus being able to reduce the overall size of the lamp.

Moreover, in the above-described structure, the front end open portion of the lamp body is formed wrapping widely around toward outside in the vehicle width direction and backward with respect to the lamp body. In other words, the side wall of the lamp body on the outer side in the vehicle width direction does not virtually exist or is very narrow. Further, the bottom wall of such a lamp body has a wedge-like shape. Therefore, the structure of the present invention in which the lighting circuit unit is attached to the side wall on the inner side in the vehicle width direction is particularly effective. The above phrase "wrapping widely around toward outside in the vehicle width direction and backward" specifically refers to the structure in which the end of the front end open portion of the lamp body on the outer side in the vehicle width direction body is positioned further to the rear than a discharge light emitting portion of the discharge bulb.

Meanwhile, when attaching the lighting circuit unit to the exterior surface of the side wall of the lamp body, it is preferable, as seen in the present invention, to attach a unit cover for covering the lighting circuit unit to the exterior surface of the side wall in order to improve the water-proof and dust-proof functions. In this case, the unit cover is attached with screws to the side wall of the lamp body at locations near upper and lower edge portions of the unit cover. With this unit cover, the strength around the attachment portion of the lighting circuit unit on the side wall of the lamp body is enhanced.

Moreover, with the above covering structure, the sealing surface of the unit cover and the side wall of the lamp body extend on a vertical plane or on a substantially vertical plane. Therefore, when water enters the unit cover, the water is easily drained out of the unit cover by its own weight. Thus, in the present invention, the unit cover has a simple waterproof structure.

DETAILED DESCRIPTION OF THE INVENTION

A typical embodiment of the present invention will be described below with reference to the accompanying drawings.

Figure 1:
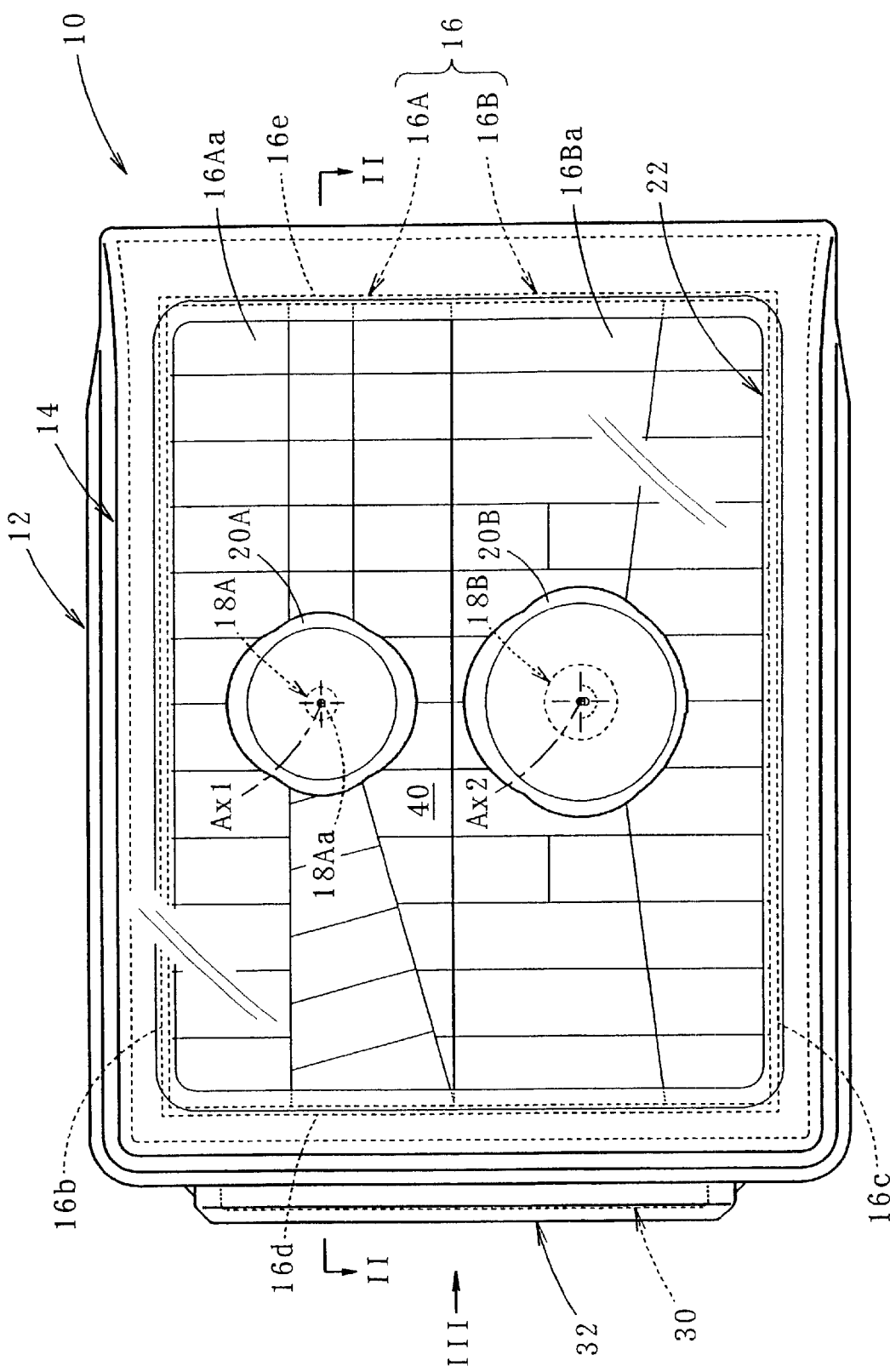
FIG. 1 is a front view of a vehicle headlamp according to an embodiment of the present invention.
Figure 2:
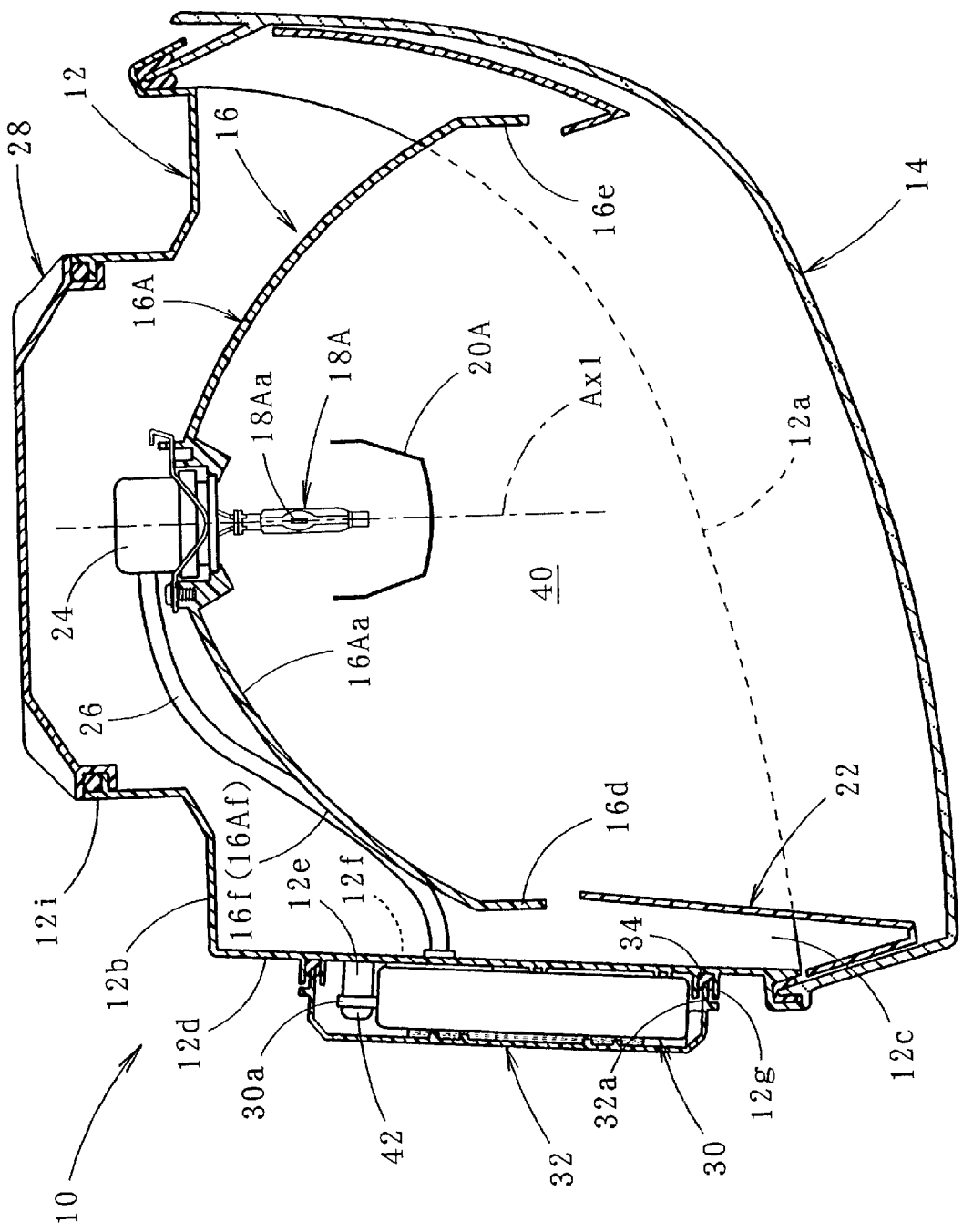
FIG. 2 is a horizontal sectional view taken along the line II—II in FIG. 1.
Figure 3:
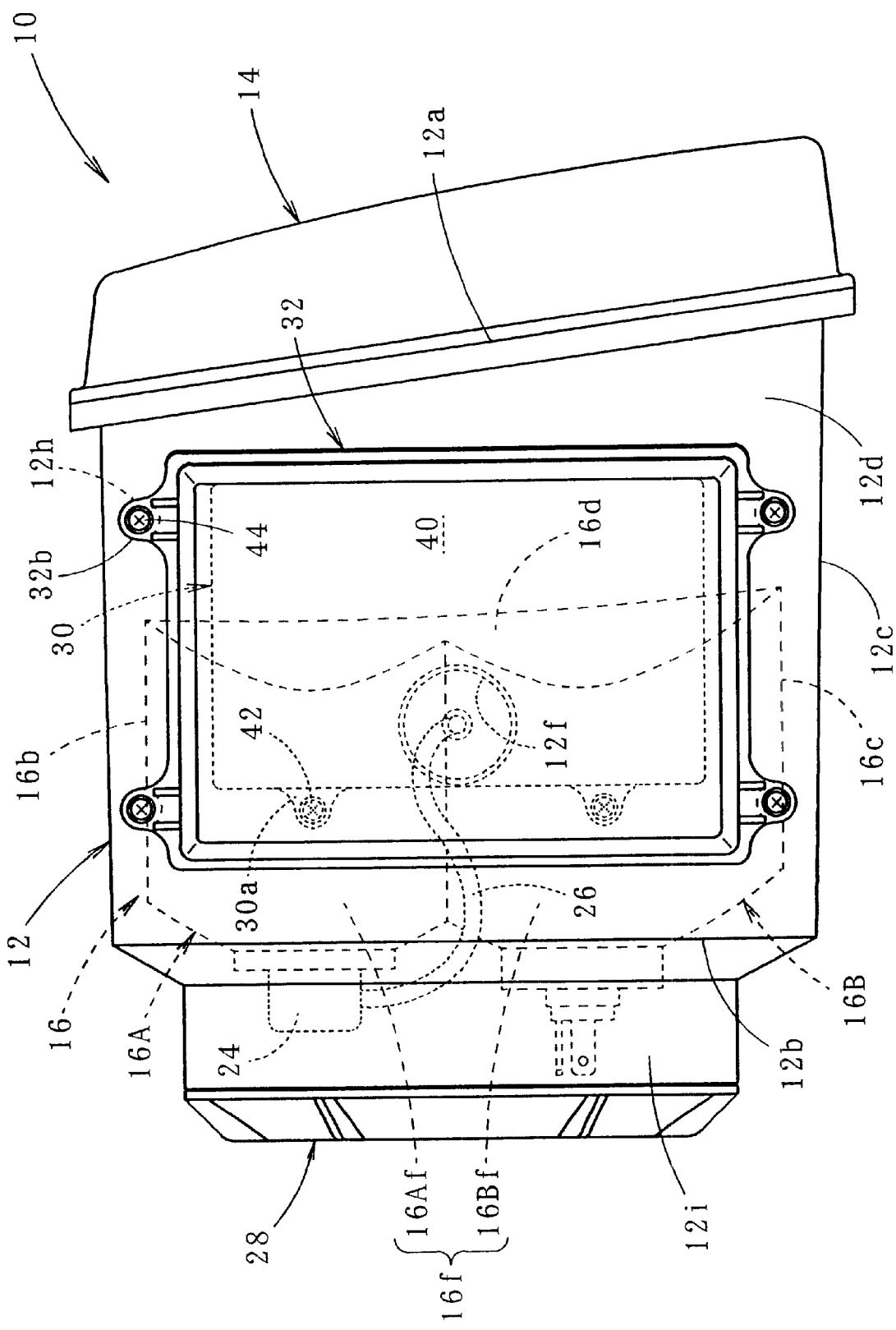
FIG. 3 is a side view taken in the direction of arrow III in FIG. 1.
Figure 4:
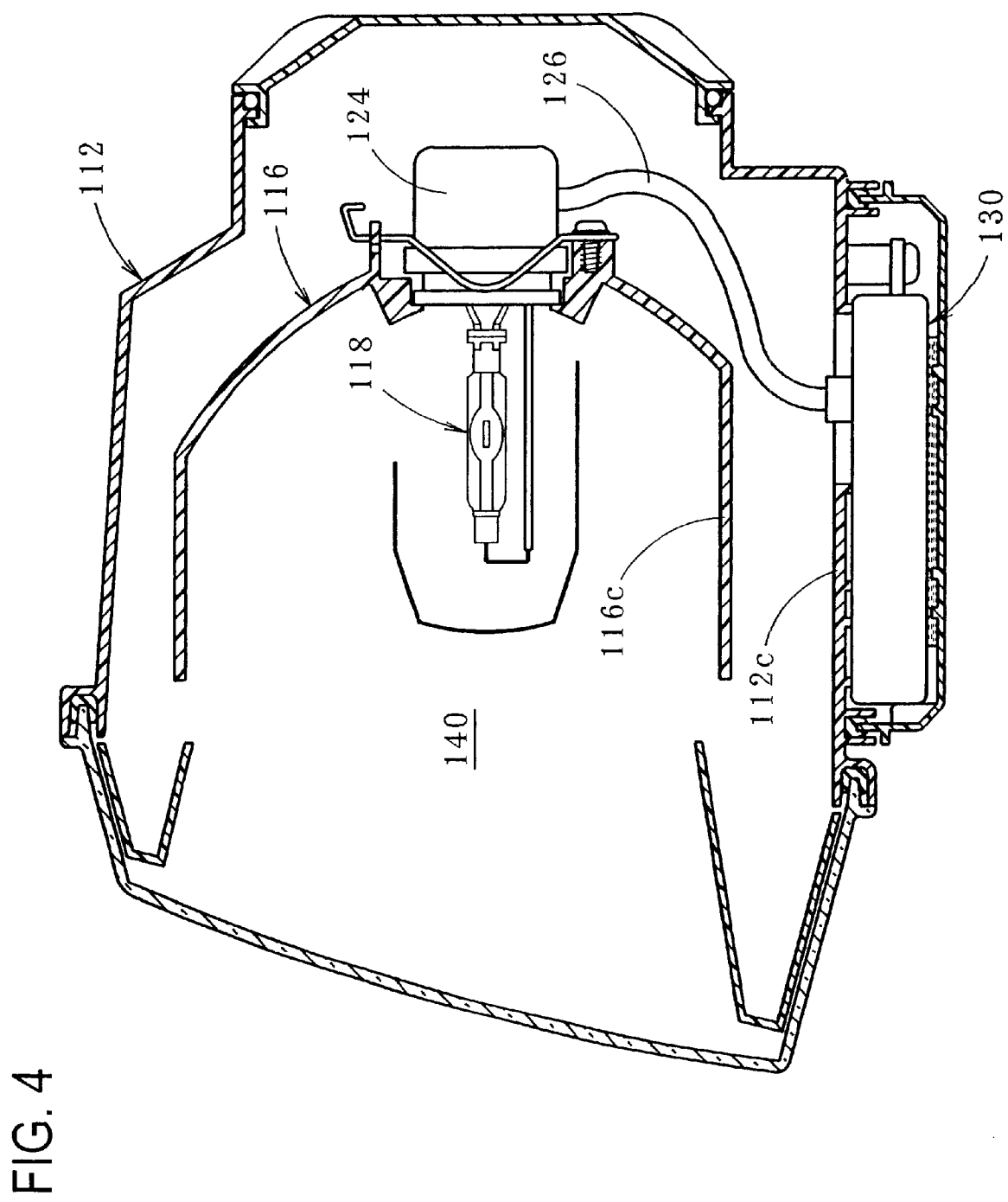
FIG. 4 is a side view of a conventional vehicle headlamp in cross section.

As seen from FIGS. 1 through 3, a vehicle headlamp 10 includes a reflector 16. The reflector 16 is disposed in a lamp chamber 40 that is formed by a lamp body 12 and a plain transparent cover 14 attached to the front end open portion 12a of the lamp body 12. The reflector 16 is tiltable in the vertical and lateral directions via an aiming mechanism (not shown). An extension reflector 22 is also provided in the lamp chamber 40. The reflector 22 is located in front of the reflector 16 and follows the shape of the opening periphery of the lamp chamber 40.

The reflector 16 comprises a first reflector portion 16A and a second reflector portion 16B that are horizontally rectangular when viewed from the front of the lamp body 12. These reflector portions 16A and 16B are disposed vertically on two levels so that the first reflector portion 16A is on top of the second reflector portion 16B as best seen from FIG. 3.

As seen from FIG. 2, a discharge bulb (metal halide bulb) 18A and a shade 20A for covering the front of the discharge bulb 18A are supported at the rear apex portion of the first reflector portion 16A. The reflecting surface 16Aa of the first reflector portion 16A is, as seen from FIG. 1, formed with a plurality of reflective elements on a paraboloid of revolution with an optical axis Ax1 that extends in the longitudinal direction as a central axis. The reflecting surface 16Aa thus having the reflective elements radiates a beam in a distribution pattern for a low beam by reflecting the light from the discharge bulb 18A forward in a diffused and deflected manner.

On the other hand, a halogen bulb (H4 bulb) 18B and a shade 20B for covering the front of the halogen bulb 18B are supported at the rear apex portion of the second reflector portion 16B. The reflecting surface 16Ba of the second reflector portion 16B is formed with a plurality of reflective elements on a paraboloid of revolution with an optical axis Ax2 that extends in the longitudinal direction as a central axis. The reflecting surface 16Ba thus having the reflective elements radiates a beam in a distribution pattern for a high beam or in a distribution pattern for a fog lamp by reflecting the light from the discharge bulb 18B forward in a diffused and deflected manner.

The reflector 16 is formed on its peripheral portion with an upper wall 16b, a bottom wall 16c, and a pair of right and left side walls 16d and 16e. The upper wall 16b and the bottom wall 16c (see FIG. 3) are formed so that the reflecting surfaces 16Aa and 16Ba are each cut large from a position relatively close to the rear apex portion of the reflector 16, while the side walls 16d and 16e (see FIG. 2) are formed so that the reflecting surfaces 16Aa and 16Ba are cut small from a position at a considerable distance in front of the rear apex portion of the reflector 16.

As best seen from FIG. 2, the transparent cover 14 is formed wrapping widely around toward outside in the vehicle width direction and backward with respect to the cover 14. As a result, the front end open portion 12a of the lamp body 12 is also formed wrapping widely around toward outside in the vehicle width direction and backward with respect to the front end open portion, and the end portion of this front end open portion 12a on the outer side (on the right side in FIG. 2) in the vehicle width direction is positioned further to the rear than the discharge light emitting portion 18Aa of the discharge bulb 18A. For this reason, the lamp body 12 has a side wall 12d that has a relatively large depth dimension in the longitudinal direction and is formed on the inner side (on the left side in FIG. 2) of the lamp body 12 in the vehicle width direction (the right and left direction in FIG. 2). On its outer side (on the right side in FIG. 2), however, the lamp body 12 has no such side wall in the vehicle width direction.

The height dimension of the side wall 12d and the rear wall 12b of the lamp body 12 is set to be relatively large values so the lamp body 12 houses the reflector 16 that has the first and second reflector portions 16A and 16B disposed vertically on two levels as described above.

An open portion 12i is formed on the rear wall 12b of the lamp body 12. The open portion 12i is for facilitating change of the discharge bulb 18A and the halogen bulb 18B. A back cover 28 is attached to the open portion 12*i*.

As seen from FIG. 2, the discharge bulb 18A is connected to the lighting circuit unit 30 via the bulb socket 24 and the electric supply cord 26. The lighting circuit unit 30, which is provided with a starting circuit and a stable circuit housed in a thin rectangular parallelepiped case, is attached to the exterior surface of the side wall 12*d* of the lamp body 12. This side wall 12*d* is located, as described above, on the inner side of the lamp body 12 with respect to the width direction of a vehicle (not shown). The lighting circuit unit 30 is set so that its longer sides are in a vertical direction as seen from FIG. 3. This attachment of the lighting circuit unit 30 is performed by making a pair of upper and lower tabs 30*a* (see FIG. 3) formed on the rear end face of the lighting circuit unit 30 abut against a pair of upper and lower bosses 12*e* formed on the side wall 12*d* and by fixing them with screws 42.

The electric supply cord 26 extends out from the lighting circuit unit 30. More specifically, the electric supply cord 26 extends from a portion that is near the rear end (see FIG. 2) of a substantially central position in the vertical direction (see FIG. 3) on the side face of the lighting circuit unit 30 that is located on the outer side (the right side in FIG. 2) in the vehicle width direction. Meanwhile, a cord receiving hole 12*f* is formed at a substantially center position of the side wall 12*d* of the lamp body 12 in the vertical direction (see FIG. 3).

Thus, when the lighting circuit unit 30 is mounted, the electric supply cord 26 together with the bulb socket 24 is inserted in the lamp chamber 40 through the cord receiving hole 12*f*, and the bulb socket 24 is fitted to the rear end portion of the discharge bulb 18A. In this case, the electric supply cord 26 is, as seen from FIG. 3, disposed along the reflecting surface back side portion 16*f* of the reflector 16 in the lamp chamber 40. Since the cord receiving hole 12*f* is formed at a substantially center position in the vertical direction of the side wall 12*d* of the lamp body 12, it is possible to dispose the electric supply cord 26 along the recessed area formed between the reflecting surface back side portion 16A*f* of the first reflector portion 16A and the reflecting surface back side portion 16B*f* of the second reflector portion 16B of the reflector 16.

A vertically elongated rectangular unit cover 32 is attached to the exterior surface of the side wall 12*d* of the lamp body 12, thus covering the lighting circuit unit 30. This attachment of the unit cover 32 to the lamp body 12 is performed: by inserting a seal leg portion 32*a* that is formed over the entire peripheral portion of the unit cover 32 into a seal groove 12*g* that is formed so as to project on the exterior surface of the side wall 12*d* with a gasket 34 in between, by making two pairs of tabs 32*b* that are formed on both upper and lower edge portions of the unit cover 32 abut against two pairs of upper and lower bosses formed near the upper and lower edge portions of the side wall 12*d*, and then by fixing the tabs 32*b* with screws 44. The unit cover 32 acts to water-proof and dust-proof the cord receiving hole 12*f*.

In addition, a hole for drainage (not shown) is formed near a sealing surface of the seal leg portion 32*a* of the unit cover 32 and the seal groove 12*g* of the side wall 12*d* at the lower end of the unit cover 32.

As described above in detail, the vehicle headlamp 10 of the shown embodiment contains the discharge bulb 18A, and the lighting circuit unit 30 for lighting this discharge bulb 18A is attached to the exterior surface of the side wall 12*d* of the lamp body 12 that is located on the inner side in the vehicle width direction. Accordingly, the operational advantages as described below are obtained.

Since the lighting circuit unit 30 is attached to the side wall 12*d* of the lamp body 12, heat generated in the lighting circuit unit 30 after lighting the discharge bulb 18A is diffused upward or sideward of the lighting circuit unit 30. Accordingly, a temperature rise in the lamp chamber 40 is effectively prevented.

Moreover, the side wall 16*d* formed on the side edge portion of the reflector 16 on the inner side in the vehicle width direction is formed so that the reflecting surfaces 16A*a* and 16B*a* are cut small from the position at a considerable distance in front of the rear apex portion of the reflector 16. Accordingly, the electric supply cord 26, that extends from the lighting circuit unit 30, can be disposed along the reflecting surface back side portion 16*f* of the reflector 16. The aiming mechanism for tilting the reflector 16 is provided between the reflecting surface back side portion 16*f* and the side wall 12*d* and the rear wall 12*b* of the lamp body 12, and this structure means that the lamp body 12 has a relatively large clearance. Therefore, unlike the conventional headlamps in which the lighting circuit unit is attached to the bottom wall of the lamp body 12, the necessity of securing a large clearance between the lamp body 12 and the reflector 16 for disposing the electric supply cord 26 is eliminated in the present invention. It is thus not necessary to reduce the size of the reflector 16 in view of the electric supply cord 26.

Furthermore, in the vehicle headlamp 10 of the shown embodiment, the transparent cover 14 and the front end open portion 12*a* of the lamp body 12 are formed wrapping widely around toward outside in the vehicle width direction and their backward directions. Accordingly, on one side of the lamp body that is located on the outer side in the vehicle width direction, there is no such flat side wall as side wall 12*d*. Thus, the side wall 12*d* on another side or on the inner side in the vehicle width direction can serve as an attachment surface for the lighting circuit unit 30, and a relatively large attachment space is secured. This advantage is not hindered even if the bottom wall 12*c* of the lamp body 12 has a wedge-like shape.

Thus, in the above embodiment, the lighting circuit unit 30 is attached to the lamp body 12 without causing a temperature rise in the lamp chamber 40 or sacrificing light distribution performance of the lamp.

Furthermore, since the reflector 16 has a structure in which the first reflector portion 16A for supporting the discharge bulb 18A and the second reflector portion 16B for supporting the halogen bulb 18B are disposed vertically on two levels, a large height dimension of the side wall 12*d* of the lamp body 12 is obtained; and as a result, a larger attachment space for the lighting circuit unit 30 can be obtained. Accordingly, the lighting circuit unit 30 can be disposed within an area defined by the side wall 12*d* on the exterior surface of the side wall 12*d* of the lamp body 12, and it is possible to effectively avoid interference with vehicle components that are provided near the lamp body.

In addition, the electric supply cord 26 that extends out from the lighting circuit unit 30 is disposed so as to be along the recessed area formed between the reflecting surface back side portion 16A*f* of the first reflector portion 16A and the reflecting surface back side portion 16B*f* of the second reflector portion 16B. Thus, an effective use of space in the lamp chamber 40 is assured, and the overall size of the lamp can be reduced.

Moreover, in the shown embodiment, the unit cover 32 for covering the lighting circuit unit 30 that is in a longitudinally elongated shape is attached to the exterior surface of the side wall 12*d* of the lamp body 12, and the unit cover 32 is fixed to both upper and lower edge portions of the side wall 12*d* with screws. Accordingly, the strength around the attachment portion of the lighting circuit unit 30 in the side wall 12*d* is enhanced. Moreover, since the seal groove 12*g* is formed on the exterior surface of the side wall 12*d* so as to surround the lighting circuit unit 30, the rigidity of the side wall 12*d* can also be enhanced.

Moreover, the sealing surface of the unit cover 32 and the side wall 12*d* of the lamp body 12 extend on a substantially vertical plane. Therefore, even if water enters the unit cover 32, the water can be easily drained out of the unit cover 32 by its own weight, thus a waterproof structure can be easily obtained for the unit cover.

What is claimed is:

1. A vehicle headlamp comprising:

a discharge bulb, a reflector for supporting said discharge bulb, a lamp body for housing said reflector, a transparent cover attached to a front end open portion of said lamp body, and a lighting circuit unit for lighting said discharge bulb, wherein said lighting circuit unit is provided on an exterior surface of a side wall of said lamp body, said side wall being located on an inner side of said lamp body in a vehicle width direction.

2. The vehicle headlamp according to claim 1, wherein said reflector comprises a first reflector portion for supporting said discharge bulb, and a second reflector portion for supporting a light source bulb other than said discharge bulb, wherein said first and second reflector portions are disposed vertically.

3. The vehicle headlamp according to claim 1, wherein said front end open portion of said lamp body is formed so as to be wrapping widely around toward an outside in said vehicle width direction and backward with respect to said front end open portion.

4. The vehicle headlamp according to claim 1, further comprising a unit cover for covering said lighting circuit unit, said unit cover being mounted on said exterior surface of said side wall on said inner side in said vehicle width direction so that said unit cover is attached by way of fixing said unit cover with screws to said side wall at portions near both upper and lower edges of said side wall.

5. The vehicle headlamp according to claim 2, wherein said front end open portion of said lamp body is formed so as to be wrapping widely around toward an outside in said vehicle width direction and backward with respect to said front end open portion.

6. The vehicle headlamp according to claim 2, further comprising a unit cover for covering said lighting circuit unit, said unit cover being mounted on said exterior surface of said side wall on said inner side in said vehicle width direction so that said unit cover is attached by way of fixing said unit cover with screws to said side wall at portions near both upper and lower edges of said side wall.

7. The vehicle headlamp according to claim 3, further comprising a unit cover for covering said lighting circuit unit, said unit cover being mounted on said exterior surface of said side wall on said inner side in said vehicle width direction so that said unit cover is attached by way of fixing said unit cover with screws to said side wall at portions near both upper and lower edges of said side wall.

8. The vehicle headlamp according to claim 5, further comprising a unit cover for covering said lighting circuit unit, said unit cover being mounted on said exterior surface of said side wall on said inner side in said vehicle width direction so that said unit cover is attached by way of fixing said unit cover with screws to said side wall at portions near both upper and lower edges of said side wall.

* * * * *